US012073986B2

(12) United States Patent
Arai et al.

(10) Patent No.: US 12,073,986 B2
(45) **Date of Patent: *Aug. 27, 2024**

(54) INDUCTOR

(71) Applicant: TAIYO YUDEN CO., LTD., Tokyo (JP)

(72) Inventors: Takayuki Arai, Tokyo (JP); Naoya Terauchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,009

(22) Filed: Sep. 6, 2023

(65) Prior Publication Data

US 2023/0411070 A1 Dec. 21, 2023

Related U.S. Application Data

(63) Continuation of application No. 17/024,304, filed on Sep. 17, 2020, now Pat. No. 11,783,993.

(30) Foreign Application Priority Data

Sep. 20, 2019 (JP) ................................ 2019-171998

(51) Int. Cl.
*H01F 27/29* (2006.01)
*H01F 17/00* (2006.01)
(Continued)

(52) U.S. Cl.
CPC ....... *H01F 27/292* (2013.01); *H01F 17/0013* (2013.01); *H01F 27/255* (2013.01); *H01F 2017/065* (2013.01)

(58) Field of Classification Search
CPC .. H01F 27/292; H01F 17/0013; H01F 27/255; H01F 2017/065
See application file for complete search history.

(56) References Cited

U.S. PATENT DOCUMENTS 4,803,453 A * 2/1989 Tomono ................ H01F 41/046 336/200
2006/0006972 A1* 1/2006 Tozawa ................ H01F 27/292 336/200

(Continued)

FOREIGN PATENT DOCUMENTS

JP H10-144526 A 5/1998

*Primary Examiner* — Malcolm Barnes
(74) *Attorney, Agent, or Firm* — Pillsbury Winthrop Shaw Pittman, LLP

(57) ABSTRACT

An inductor according to one embodiment includes: a base body having a mounting surface, a top surface, and a first end surface; first and second external electrodes provided to the mounting surface and spaced from each other; and an conductor disposed inside the base body. One end of the conductor is exposed from the mounting surface and connected to the first external electrode, and the other end of the conductor is exposed from the mounting surface and connected to the second external electrode. The base body is partitioned into a first region and a second region, the first region being enclosed by the conductor and the mounting surface, and a ratio of an area of the second region to an area of the first region is 0.95 to 1.0. The conductor contains a conductive material having a higher electric conductivity than a material of the first external electrode.

16 Claims, 10 Drawing Sheets

(51) Int. Cl.
*H01F 17/06* (2006.01)
*H01F 27/255* (2006.01)

(56) References Cited

U.S. PATENT DOCUMENTS

| | | | | |
|---|---|---|---|---|
| 2008/0012674 | A1* | 1/2008 | Sano | H05K 1/0233 336/83 |
| 2008/0136576 | A1* | 6/2008 | Emmons | H01F 27/36 336/84 M |
| 2010/0039200 | A1* | 2/2010 | Yan | H01F 17/04 336/147 |
| 2014/0176278 | A1* | 6/2014 | Lee | H01F 41/10 29/606 |
| 2015/0048915 | A1* | 2/2015 | Yoon | H01F 17/0013 336/192 |
| 2017/0018351 | A1* | 1/2017 | Yatabe | H01F 27/2804 |
| 2017/0018360 | A1* | 1/2017 | Osada | H01F 17/04 |
| 2017/0053732 | A1* | 2/2017 | Moon | H01F 17/04 |
| 2018/0096783 | A1* | 4/2018 | Fukuda | H01F 27/366 |
| 2019/0272945 | A1* | 9/2019 | Arai | H01F 27/28 |
| 2019/0272946 | A1* | 9/2019 | Arai | H01F 17/06 |
| 2020/0105456 | A1* | 4/2020 | Kim | H01F 27/292 |

* cited by examiner

INDUCTOR

CROSS-REFERENCE TO RELATED APPLICATIONS

This application is a continuation of U.S. patent application Ser. No. 17/024,304 (filed on Sep. 17, 2020), which claims the benefit of priority from Japanese Patent Application Serial No. 2019-171998 (filed on Sep. 20, 2019), the contents of which are hereby incorporated by reference in their entirety.

TECHNICAL FIELD

The present invention relates to an inductor.

BACKGROUND

As disclosed in Japanese Patent Application Publication No. Hei 10-144526 ("the '526 Publication"), there is conventionally known an inductor including a magnetic base body made of a ferrite material, a rectangular parallelepiped internal conductor provided in the magnetic base body, and two external electrodes connected to one end and the other end of the internal conductor, respectively. The internal conductor extends linearly from one of the external electrodes to the other in plan view. An inductor of this type is required to have a low direct current (DC) resistance (Rdc) and excellent DC superposition characteristics. The inductor of the '526 Publication includes an internal conductor laminated with a plurality of conductor patterns. Each of the plurality of conductor patterns is connected in parallel between the pair of the external electrodes, so as to reduce the DC resistance in the internal conductor. Further, in the inductor of the '526 Publication, the cross-sectional shape of the internal conductor is similar to that of the magnetic base body, thereby improving the DC superposition characteristics.

In recent years, the trend toward larger currents in devices and circuits, particularly in the electrical components of automobiles, has led to demands for further reduction of the DC resistance (Rdc). Also, inductors having a reduced DC resistance are required to have excellent DC superposition characteristics.

SUMMARY

One specific object of the present invention is to provide a novel inductor having a further reduced DC resistance. Another object of the present invention is to inhibit deterioration of the DC superposition characteristics in an inductor having a reduced DC resistance. Other objects of the present invention will be made apparent through the entire description in the specification.

An inductor according to one embodiment of the present invention includes: a base body having a mounting surface facing a circuit board, a top surface opposed to the mounting surface, and a first end surface connecting between the mounting surface and the top surface; a first external electrode attached to the mounting surface of the base body; a second external electrode attached to the mounting surface, the second external electrode being spaced from the first external electrode in a length direction perpendicular to the first end surface; and an internal conductor disposed in the base body. In plan view from a thickness direction perpendicular to the mounting surface, the internal conductor extends linearly from the first external electrode to the second external electrode. One end of the internal conductor is exposed from the mounting surface and connected to the first external electrode, and the other end of the internal conductor is exposed from the mounting surface and connected to the second external electrode. In one embodiment, in front view from a width direction perpendicular to the thickness direction and the length direction, the base body is partitioned into a first region and a second region, the first region being enclosed by the internal conductor and the mounting surface, the second region being the rest of the base body, and the first region has a first area, and the second region has a second area, and a ratio of the second area to the first area is within a range of 0.95 to 1.1.

In one embodiment of the present invention, the base body has a second end surface opposed to the first end surface. In the front view, the second region includes a first strip region and a second strip region, the first strip region being positioned between the internal conductor and the first end surface such that a distance between the internal conductor and the first end surface is smaller than a top margin representing a distance between the internal conductor and the top surface, the second strip region being positioned such that a distance between the internal conductor and the second end surface is smaller than the top margin. A ratio of an adjusted second area to the first area is within a range of 0.86 to 1.0, the adjusted second area being obtained by subtracting an area of the first strip region and an area of the second strip region from the second area.

The first external electrode is attached to the base body so as to contact with only the mounting surface thereof. In one embodiment of the present invention, the second external electrode is attached to the base body so as to contact with only the mounting surface thereof.

In one embodiment of the present invention, in the front view, a shortest distance between an axis of the internal conductor and the top surface is smaller than a half of a distance between the mounting surface and the top surface of the base body.

In one embodiment of the present invention, a cross section of the internal conductor cut along a direction perpendicular to an axis of the internal conductor has a first cross-sectional area, and a cross section of the first external electrode cut along a direction parallel with the mounting surface has a second cross-sectional area, and the first cross-sectional area is larger than the second cross-sectional area.

In one embodiment of the present invention, the internal conductor is made of a conductive material having a higher electric conductivity than a material of the first external electrode.

In one embodiment of the present invention, the first external electrode is so positioned as to be opposed to a first land of the circuit board, the second external electrode is so positioned as to be opposed to a second land of the circuit board, a first end surface of the internal conductor contacting with the first external electrode is opposed to the first land, and a second end surface of the internal conductor contacting with the second external electrode is opposed to the second land.

In one embodiment of the present invention, the base body contains metal magnetic particles.

In one embodiment of the present invention, the internal conductor includes a first internal conductor pattern and a second internal conductor pattern spaced from the first internal conductor pattern within the base body, and in plan view from a thickness direction perpendicular to the mounting surface, each of the first internal conductor pattern and the second internal conductor pattern extends linearly from the first external electrode to the second external electrode, with one end thereof exposed from the mounting surface and connected to the first external electrode, and the other end thereof exposed from the mounting surface and connected to the second external electrode.

An embodiment of the present invention relates to a circuit board comprising any one of the above inductors.

An embodiment of the present invention relates to an electronic device comprising the above circuit board.

Advantageous Effects

According to this disclosure, an inductor having a reduced DC resistance is provided with its DC superposition characteristics maintained.

DESCRIPTION OF THE EMBODIMENTS

Various embodiments of the present invention will be hereinafter described with reference to the drawings. Elements common to a plurality of drawings are denoted by the same reference signs throughout the plurality of drawings. It should be noted that the drawings do not necessarily appear to an accurate scale for convenience of explanation.

Figure 1:
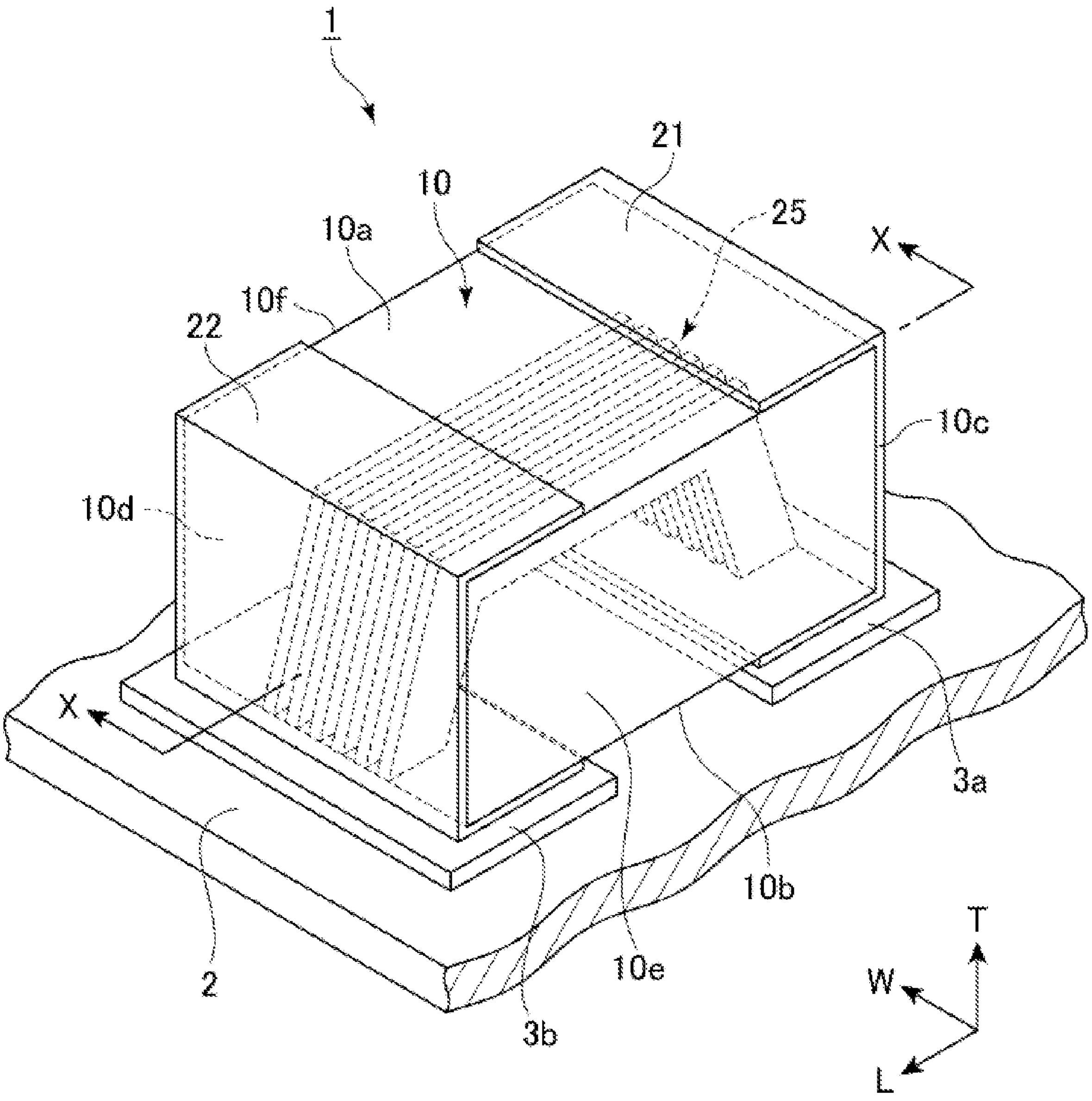
FIG. 1 is a perspective view of an inductor according to one embodiment of the invention mounted on a circuit board.
Figure 2:
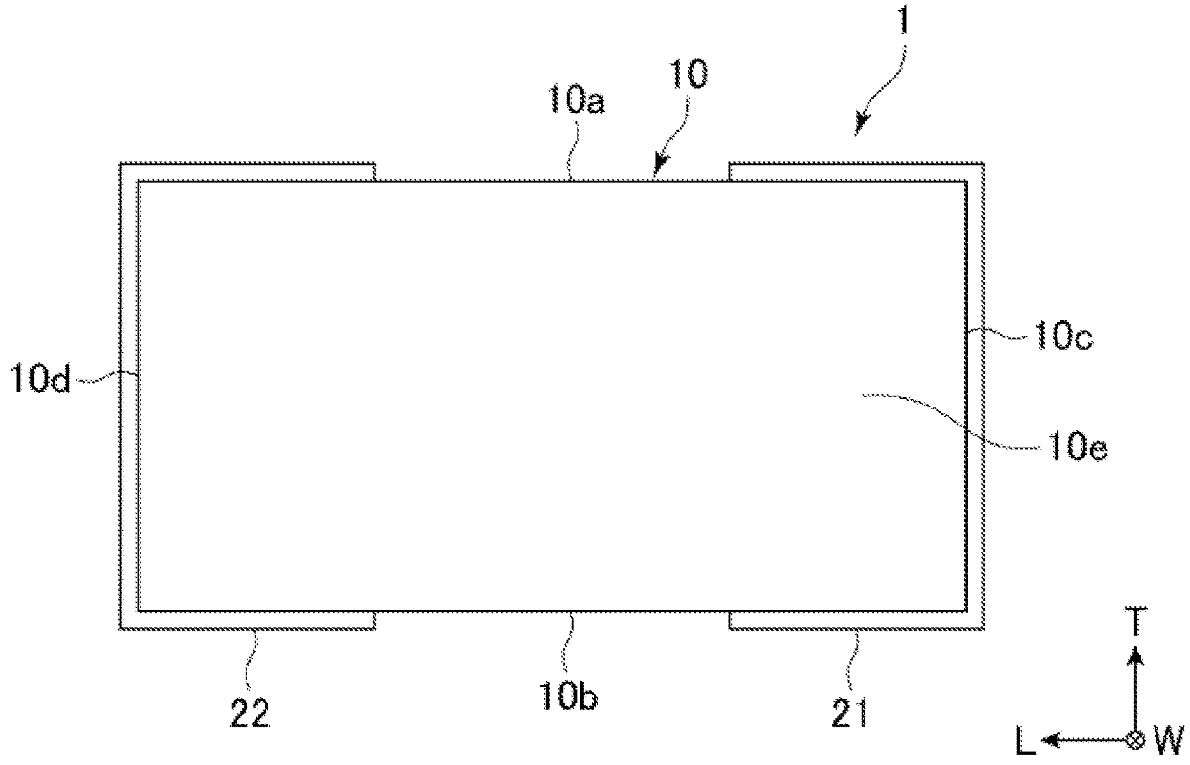
FIG. 2 is a front view of the inductor of FIG. 1.
Figure 3:
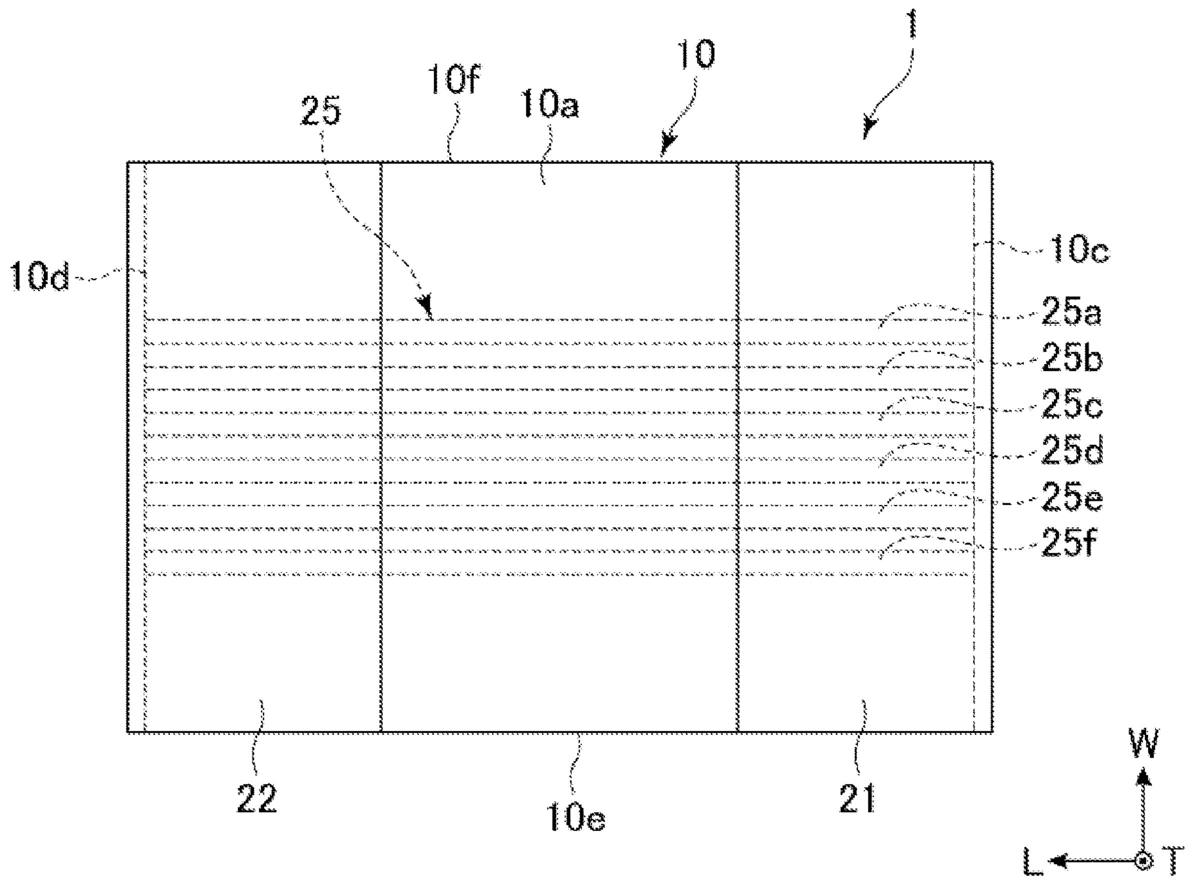
FIG. 3 is a plan view of the inductor of FIG. 1.

An inductor 1 according to one embodiment of the present invention will now be described with reference to FIGS. 1 to 5. First, with reference to FIGS. 1 to 3, an outline is given of the inductor 1. FIG. 1 is a perspective view of the inductor 1 according to one embodiment of the present invention, FIG. 2 is a front view of the same, and FIG. 3 is a plan view of the same. As shown, the inductor 1 includes a base body 10, an internal conductor 25 disposed in the base body 10, an external electrode 21 disposed on the surface of the base body 10, and an external electrode 22 disposed on the surface of the base body 10 at a position spaced from the external electrode 21.

Each of the drawings shows the L axis, the W axis, and the T axis orthogonal to one another. In this specification, the "length" direction, the "width" direction, and the "thickness" direction of the inductor 1 are referred to as the "L" direction, the "W" direction, and the "T" direction in FIG. 1, respectively, unless otherwise construed from the context. According to the directions set as above, the external electrode 22 is spaced from the external electrode 21 in the length direction (the L direction).

The inductor 1 is used in, for example, a large-current circuit through which a large electric current flows. The inductor 1 may be used in a signal circuit or a high-frequency circuit. The inductor 1 may be used as a bead inductor for noise elimination.

The inductor 1 is mounted on a circuit board 2. A mounting board of the circuit board 2 has two lands 3*a*, 3*b* provided thereon. The external electrode 21 is so positioned as to be opposed to the land 3*a* when the inductor 1 is mounted on the circuit board 2, and the external electrode 22 is so positioned as to be opposed to the land 3*b* of the circuit board 2 when the inductor 1 is mounted on the circuit board 2. The inductor 1 may be mounted on the circuit board 2 by soldering between the external electrode 21 and the land 3*a* and between the external electrode 22 and the land 3*b*. Various electronic components other than the inductor 1 may also be mounted on the circuit board 2. The circuit board 2 can be installed in various electronic devices. Electronic devices in which the circuit board 2 may be installed include smartphones, tablets, game consoles, electrical components of automobiles, and various other electronic devices. The inductor 1 may be a built-in component embedded in the mounting board of the circuit board 2.

The base body 10 is made of a magnetic material and formed in a rectangular parallelepiped shape. In one embodiment of the invention, the base body 10 has a length (the dimension in the L direction) of 0.4 to 10 mm, a width (the dimension in the W direction) of 0.2 to 10 mm, and a thickness (the dimension in the T direction) of 0.2 to 10 mm. The present invention is applicable broadly to various inductors ranging from a relatively small-sized inductor to a relatively large-sized inductor. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. Each of the first end surface 10*c* and the second end surface 10*d* connects the first principal surface 10*a* to the second principal surface 10*b* and connects the first side surface 10*e* to the second side surface 10*f*. Based on the position of the circuit board 2, the first principal surface 10*a* lies on the top side of the base body 10, and therefore, the first principal surface 10*a* may be herein referred to as "the top surface." Similarly, the second principal surface 10*b* may be referred to as "the bottom surface." The inductor 1 is disposed such that the second principal surface 10*b* faces the circuit board 2, and therefore, the second principal surface 10*b* may be herein referred to as "the mounting surface" or "the mounting surface 10*b*." The top-bottom direction of the inductor 1 refers to the top-bottom direction in FIG. 1. The thickness direction of the inductor 1 or the base body 10 may be the direction perpendicular to at least one of the top surface 10*a* and the mounting surface 10*b*. The length direction of the inductor 1 or the base body 10 may be the direction perpendicular to at least one of the first end surface 10*c* and the second end surface 10*d*. The width direction of the inductor 1 or the base body 10 may be the direction perpendicular to at least one of the first side surface 10*e* and the second side surface 10*f*. The width direction of the inductor 1 or the base body 10 may be the direction perpendicular to the thickness direction and the length direction of the inductor 1 or the base body 10.

Figure 10:
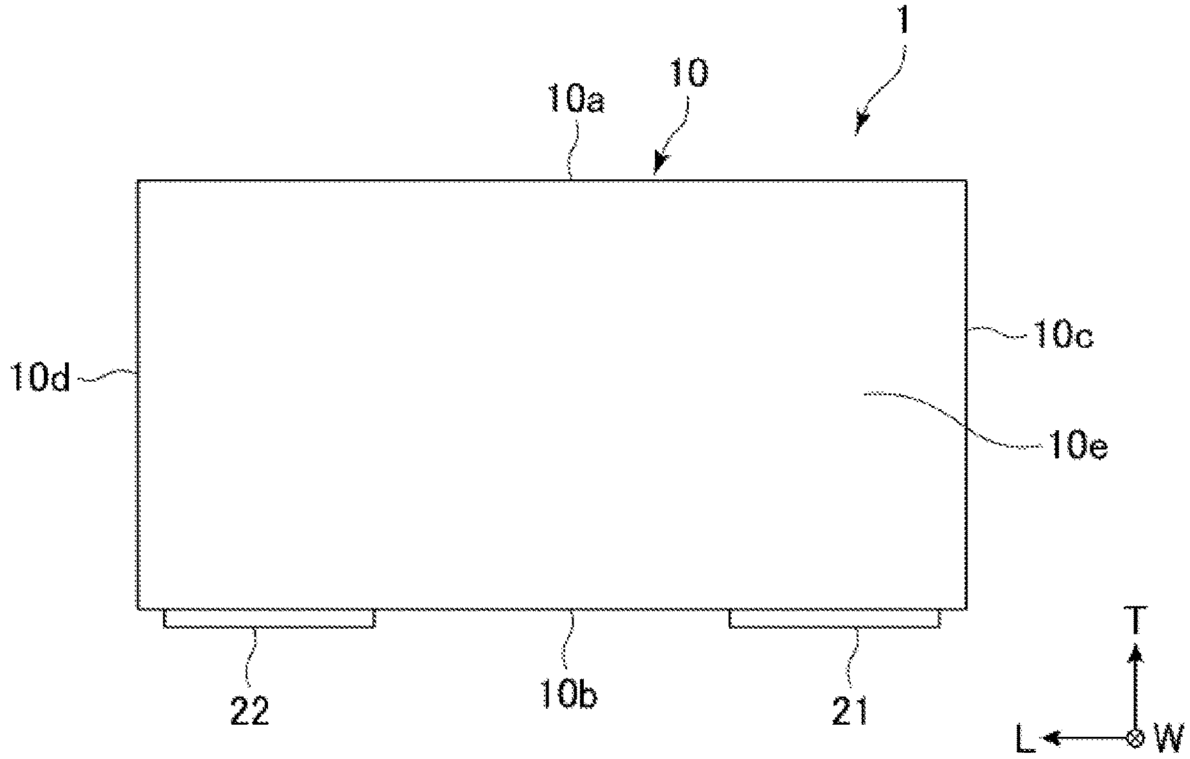
FIG. 10 is a front view of an inductor according to another embodiment of the present invention.

In the embodiment shown, the external electrode 21 contacts with the mounting surface 10*b*, the first end surface 10*c*, and the top surface 10*a* of the base body 10. The external electrode 22 contacts with the mounting surface 10*b*, the second end surface 10*d*, and the top surface 10*a* of the base body 10. It is also possible that at least one of the external electrodes 21, 22 is provided on the base body 10 so as to contact with only the mounting surface 10*b*. FIG. 10 shows the inductor 1 having the external electrodes 21, 22 both contacting with only the mounting surface 10*b*. The shape and arrangement of the external electrodes 21, 22 are not limited to those explicitly described herein.

The base body 10 is made of a magnetic material. The magnetic material for the base body 10 may contain a plurality of metal magnetic particles. The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. The Fe-based metal magnetic particles contained in the base body 10 may contain 80 wt % or more Fe. An insulating film may be formed on the surface of each of the metal magnetic particles. The insulating film may be an oxide film made of an oxide of the above metals or alloys. The insulating film provided on the surface of each of the metal magnetic particles may be, for example, a silicon oxide film provided by the sol-gel coating process.

In one embodiment, the average particle size of the metal magnetic particles is from 1.5 μm to 20 μm. The average particle size of the metal magnetic particles contained in the base body 10 may be smaller than 1.5 μm or larger than 20 μm. The base body 10 may contain two or more types of metal magnetic particles having different average particle sizes. For example, the metal magnetic particles for a composite magnetic material may include first metal magnetic particles having a first average particle size and second metal magnetic particles having a second average particle size smaller than the first average particle size.

The base body 10 may be formed of a composite magnetic material containing the metal magnetic particles and a binder. When the base body 10 is formed of the composite magnetic material, the binder included in the composite magnetic material is, for example, a thermosetting resin with excellent insulation properties. Examples of the binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. Also, the binder may be the oxide film on the surface of each metal magnetic particle or an oxide other than the oxide film. The metal magnetic particles may be bound together by these oxides.

The internal conductor 25 is provided in the base body 10 so as to electrically connect between the external electrode 21 and the external electrode 22. The internal conductor 25 may include either a plurality of internal conductor patterns or a single internal conductor pattern. In the embodiment shown, the internal conductor 25 includes six internal conductor patterns 25*a* to 25*f*. The internal conductor pattern 25*a* has one end and the other end thereof exposed from the mounting surface 10*b* toward the outside of the base body 10. The one end is connected to the external electrode 21, and the other end is connected to the external electrode 22. The end surface of the internal conductor 25 contacting with the external electrode 21 is opposed to the land 3*a* when the inductor 1 is mounted on the circuit board 2, and the end surface of the internal conductor 25 contacting with the external electrode 22 is opposed to the land 3*b* when the inductor 1 is mounted on the circuit board 2. The internal conductor patterns 25*b* to 25*f* have the same or similar shape as the internal conductor pattern 25*a*. In the base body 10, the internal conductor patterns 25*a* to 25*f* are spaced from one another. In this way, the internal conductor patterns 25*a* to 25*f* are arranged in parallel between the external electrode 21 and the external electrode 22 in the base body 10. Each of the internal conductor patterns 25*a* to 25*f* may be connected with adjacent internal conductor patterns. For example, a part or whole of the internal conductor pattern 25*b* may be connected with at least one of the internal conductor pattern 25*a* and the internal conductor pattern 25*c* in the base body 10.

As shown in FIG. 3, the internal conductor pattern 25*a* extends linearly from the external electrode 21 to the external electrode 22 in plan view (as viewed from the T axis). That is, the internal conductor pattern 25*a* has no parts that are opposed to each other in the base body 10 in plan view. Herein, when the internal conductor pattern 25*a* has no parts that are opposed to each other in the base body 10 in plan view, the internal conductor pattern 25*a* is regarded as extending linearly from the external electrode 21 to the external electrode 22. The internal conductor pattern may be disposed on a straight line extending from the external electrode 21 to the external electrode 22. As with the internal conductor pattern 25*a*, the internal conductor pattern 25*b* extends linearly from the external electrode 21 to the external electrode 22 in plan view (as viewed from the T axis).

Figure 4:
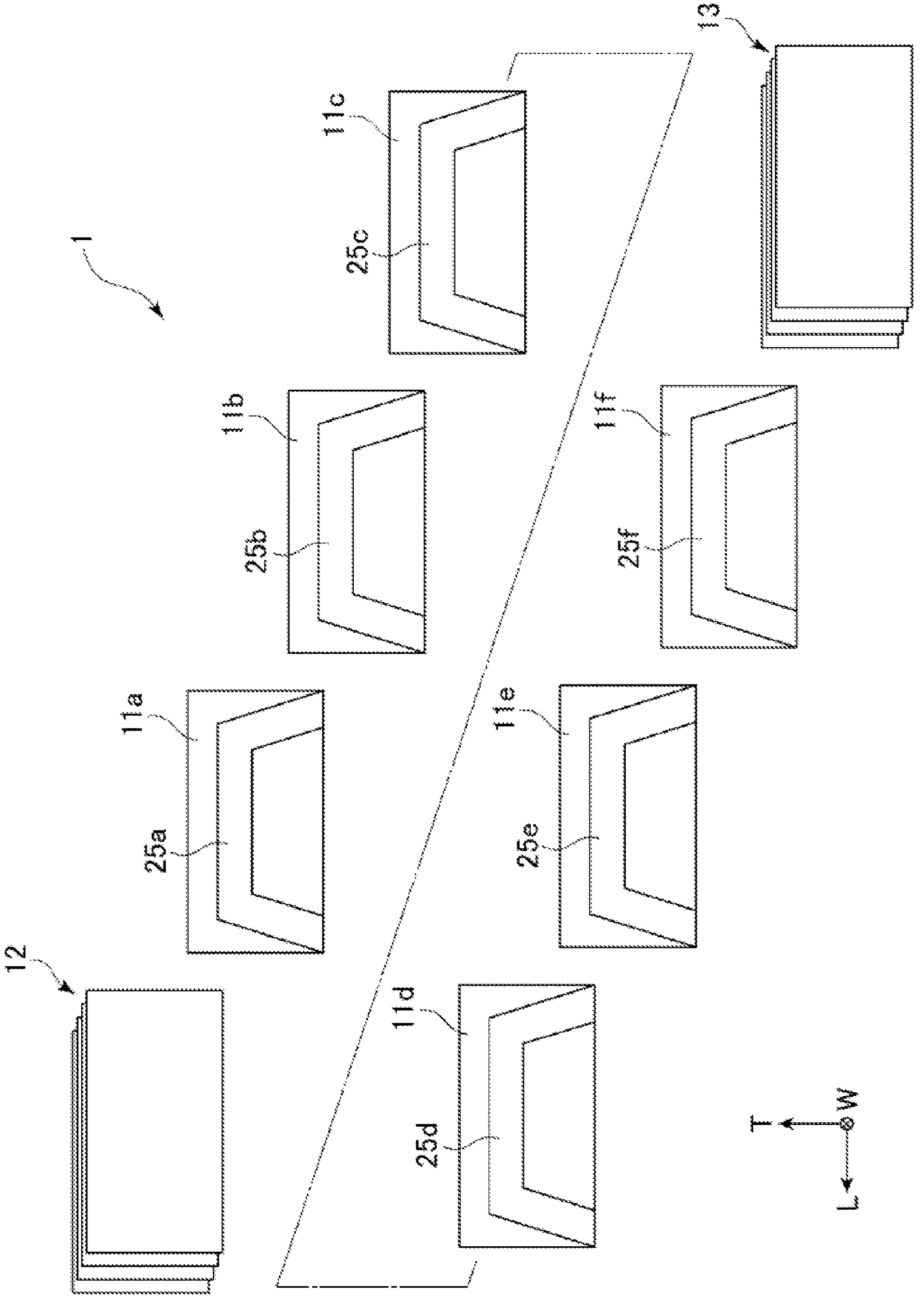
FIG. 4 is an exploded view of the inductor of FIG. 1.

Next, with further reference to FIG. 4, a description is given of the lamination structure of the inductor 1 formed by a laminating process. FIG. 4 is an exploded view of the inductor 1. In FIG. 4, the external electrodes 21, 22 are not shown for convenience of description. As shown in FIG. 4, the base body 10 includes magnetic layers 11*a* to 11*f*, a cover layer 12, and a cover layer 13. Each of the magnetic layers 11*a* to 11*f*, the cover layer 12, and the cover layer 13 is made of a magnetic material. The base body 10 is laminated with the cover layer 12, the magnetic layers 11*a* to 11*f*, and the cover layer 13, which are arranged in the stated order from the positive side to the negative side in the W-axis direction. Each of the cover layers 12, 13 may include a plurality of magnetic layers. The inductor 1 may be formed using a technique other than the laminating process. For example, the inductor 1 may be alternatively formed by the thin film process or the compression molding process.

Each of the magnetic layers 11*a* to 11*f* has corresponding one of the internal conductor patterns 25*a* to 25*f* provided on one surface thereof. In the embodiment shown, each of the magnetic layers 11*a* to 11*f* has corresponding one of the internal conductor patterns 25*a* to 25*f* provided on the negative side surface thereof in the W-axis direction, among the pair of surfaces thereof intersecting the W-axis direction. The internal conductor patterns 25*a* to 25*f* are formed by, for example, printing a conductive paste made of a metal or alloy having an excellent electrical conductivity by screen printing. The surfaces of the magnetic layers 11*a* to 11*f* on which the internal conductor patterns 25*a* to 25*f* are formed are an example of coil forming surfaces. The conductive paste may be made of Ag, Pd, Cu, Al, or alloys thereof. The internal conductor patterns 25*a* to 25*f* may be formed by a method other than screen printing, such as sputtering, ink-jetting, or other known methods. In one embodiment, the internal conductor patterns 25*a* to 25*f* are formed of a material having a higher electric conductivity than the external electrodes 21, 22.

Figure 5:
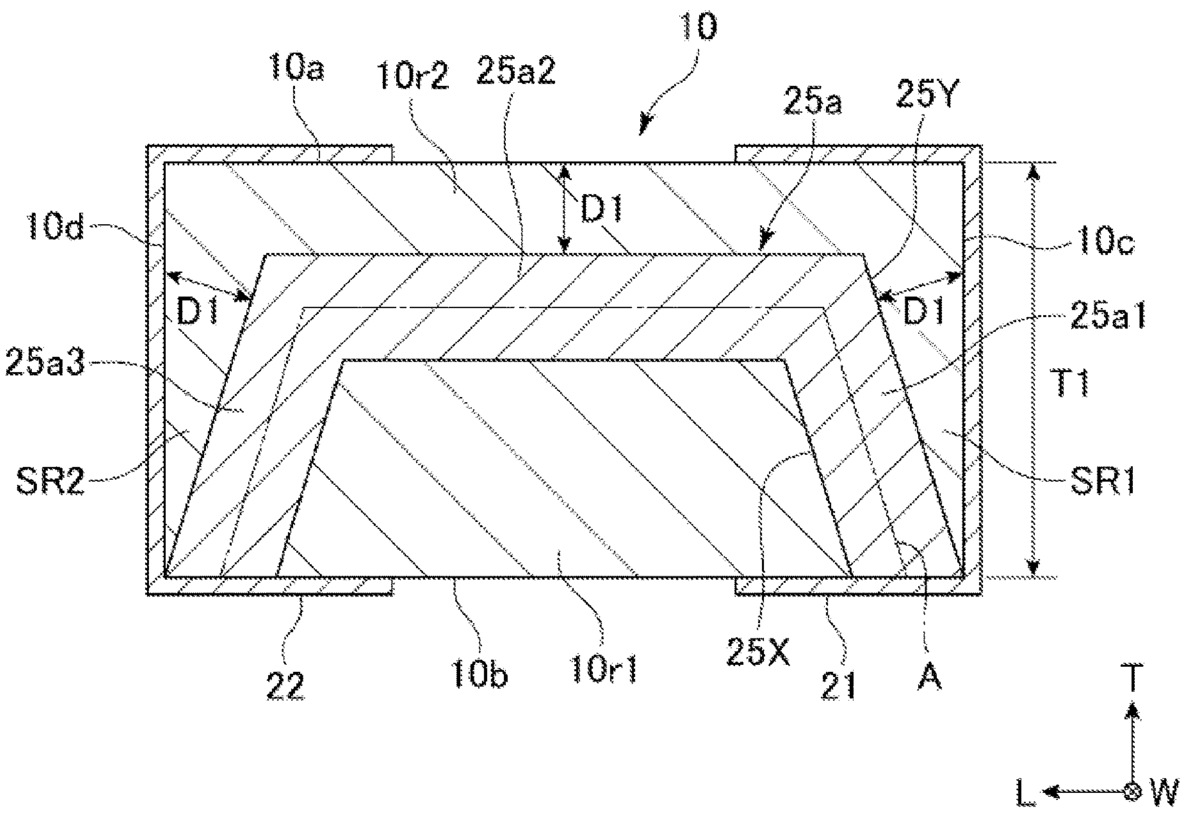
FIG. 5 is a cross-sectional view of the inductor of FIG. 1 cut along the line X-X.

Next, a description is given of the internal conductor pattern 25*a* with further reference to FIG. 5. FIG. 5 is a cross-sectional view of the inductor 1 cut along the line X-X. The cross-sectional surface of the inductor 1 along the line X-X includes a cross-sectional surface of the base body 10 cut along a plane in parallel with the LT plane and extending through the internal conductor pattern 25*a*. FIG. 5 can be regarded as a view through the base body 10 showing the internal conductor pattern 25*a* in the front view from the W-axis direction (i.e., from the width direction). The description on the internal conductor pattern 25*a* also applies to the internal conductor patterns 25*b* to 25*f*, to the extent possible in the context. That is, the internal conductor patterns 25*a* to 25*f* are hereinafter described, taking the internal conductor pattern 25*a* as an example.

As shown, the internal conductor pattern 25*a* extends from the external electrode 21 to the external electrode 22 along the axis A extending from the external electrode 21 to the external electrode 22. The internal conductor pattern 25*a* includes a first portion 25*al*, a second portion 25*a*2, and a third portion 25*a*3. The first portion 25*a*1 is exposed at its bottom-side end from the mounting surface 10*b* and extends, from the bottom-side end, in the positive direction of T axis obliquely to the T axis. The second portion 25*a*2, which is connected to the top-side end of the first portion 25*a*1, extends in the positive direction of the L axis. The third portion 25*a*3, which is connected to the end of the second portion 25*a*2 in the positive direction of the L axis, extends in the negative direction of the T axis obliquely to the T axis and is exposed at its bottom-side end from the mounting surface 10*b*. The bottom-side end of the first portion 25*a*1 is connected to the external electrode 21, and the bottom-side end of the third portion 25*a*3 is connected to the external electrode 22. In the embodiment shown, the second portion 25*a*2 extends in parallel with the top surface 10*a*. In the embodiment shown, the internal conductor pattern 25*a* has a shape corresponding to three of four sides of a trapezoid other than the bottom base (the two legs and the top base). Specifically, the second portion 25*a*2 corresponds to the top base of the trapezoid, and the first portion 25*a*1 and the third portion 25*a*3 correspond to the legs of the trapezoid.

The internal conductor pattern 25*a* has an inner peripheral surface 25X and an outer peripheral surface 25Y. The inner peripheral surface 25X is positioned between the axis A and the mounting surface 10*b* and extends in parallel with the axis A from the external electrode 21 to the external electrode 22, and the outer peripheral surface 25Y is positioned between the axis A and the top surface 10*a* and extends in parallel with the axis A from the external electrode 21 to the external electrode 22. The axis A of the internal conductor pattern 25*a* may be determined based on the inner peripheral surface 25X. For example, the axis A may be an aggregate of points at an equal distance from the inner peripheral surface 25X. Alternatively, the axis A may be an aggregate of the middle points of line segments each extending between a point in the inner peripheral surface 25X and a point in the outer peripheral surface 25Y in a direction normal to the inner peripheral surface 25X. The axis A corresponds substantially to the direction of the electric current flowing in the internal conductor pattern 25*a*.

In one embodiment, the cross-sectional area of the internal conductor pattern 25*a* cut along the direction perpendicular to the axis A (the internal conductor cross-sectional area) is larger than the cross-sectional area of the portion of the external electrode 21 in contact with the first end surface 10*c* cut along the direction parallel with the mounting surface 10*b* (the external conductor cross-sectional area). In one embodiment, the cross-sectional area of the internal conductor pattern 25*a* cut along the direction perpendicular to the axis A is larger than the cross-sectional area of the portion of the external electrode 22 in contact with the second end surface 10*d* cut along the direction parallel with the mounting surface 10*b*. When the cross-sectional area of the external electrode 21 along the mounting surface 10*b* is not uniform, the cross-sectional area of the external electrode 21 may be set at the average of the cross-sectional areas of the external electrode 21 at three levels spaced equally in the T axis direction. The cross-sectional area of the external electrode 22 may be set in the same manner.

The internal conductor pattern 25*a* is positioned at a distance of the top margin D1 from the top surface 10*a*. Specifically, the internal conductor pattern 25*a* is positioned such that the distance between the top surface 10*a* of the base body 10 and the outer peripheral surface 25Y of the internal conductor pattern 25*a* is the top margin D1. In the embodiment shown, the first portion 25*a*1 of the internal conductor pattern 25*a* is oblique to the first end surface 10*c*. Therefore, the region in the cross section of the base body 10 between the first portion 25*a*1 and the first end surface 10*c* is narrower toward the external electrode 21. Within the region between the first portion 25*a*1 and the first end surface 10*c*, the narrow region having a width equal to or smaller than the top margin D1 is the first strip region SR1. The width between the first portion 25*a*1 and the first end surface 10*c* refers to the width between the outer peripheral surface 25Y of the first portion 25*a*1 and the first end surface 10*c*. The width between the first portion 25*a*1 and the first end surface 10*c* refers to, for example, the distance between the outer peripheral surface 25Y and the first end surface 10*c* along the direction perpendicular to the axis A. Likewise, the region between the third portion 25*a*3 and the second end surface 10*d* is narrower toward the external electrode 22. Within the region between the third portion 25*a*3 and the second end surface 10*d*, the narrow region having a width equal to or smaller than the top margin D1 is the second strip region SR2.

In one embodiment, the internal conductor pattern 25*a* is configured and positioned such that the distance between the axis A and the top surface 10*a* of the base body 10 is smaller than a half of the distance between the top surface 10*a* and the mounting surface 10*b* in the cross section along the line X-X. In the embodiment shown, the distance between the top surface 10*a* and the mounting surface 10*b* is equal to the dimension T1 of the base body 10 in the height direction.

In the cross section along the line X-X (that is, in the front view from the W axis), the base body 10 is partitioned into a first region 10*r*1 and a second region 10*r*2 by the internal conductor pattern 25*a*. The first region 10*r*1 is enclosed by the internal conductor pattern 25*a* and the mounting surface 10*b*, and the second region 10*r*2 is the region other than the first region 10*r*1. Specifically, in the front view from the W axis, the first region 10*r*1 is enclosed by an inner peripheral edge and a bottom edge. The inner peripheral edge is the line of intersection between the inner peripheral surface 25X and the cross section along the line X-X, and the bottom edge is the line of intersection between the mounting surface 10*b* and the cross section along the line X-X. In the front view from the W axis, the second region 10*r*2 is enclosed by an outer peripheral edge, a top edge, a right edge, and a left edge. The outer peripheral edge is the line of intersection between the outer peripheral surface 25Y and the cross section along the line X-X, the top edge is the line of intersection between the top surface 10*a* and the cross section along the line X-X, the right edge is the line of intersection between the first end surface 10*c* and the cross section along the line X-X, and the left edge is the line of intersection between the second end surface 10*d* and the cross section along the line X-X. The internal conductor pattern 25*a* is configured and positioned such that the magnetic flux density of the first region 10*r*1 is the same or substantially the same as the magnetic flux density of the second region 10*r*2. That is, in one embodiment of the present invention, since the magnetic flux density of the first region 10*r*1 is equal or substantially equal to the magnetic flux density of the second region 10*r*2, thereby preventing concentrated magnetic saturation in one of the first region 10*r*1 and the second region 10*r*2. For example, when the first area Si of the first region 10*r*1 is equal or substantially equal to the second area S2 of the second region 10*r*2, the magnetic flux density of the first region 10*r*1 can be equal or substantially equal to the magnetic flux density of the second region 10*r*2.

In the second region 10*r*2, the strip regions SR1, SR2 have a smaller width than the other regions in the second region 10*r*2 (for example, the region between the top surface 10*a* of the base body 10 and the second portion 25*a*2). Therefore, in the second region 10*r*2, magnetic saturation is likely to occur particularly in the strip regions SR1, SR2. Supposing that the strip regions SR1, SR2 have areas S3, S4, respectively, the areas S3 and S4 are smaller than the areas S1 and S2. Therefore, the second region 10*r*2 receives less magnetic influence of the strip regions SR1, SR2, and the contributions thereof can be ignored. Thus, in one embodiment, the internal conductor pattern 25*a* is configured and positioned such that the area S1 of the first region 10*r*1 is equal or substantially equal to the adjusted second area obtained by subtracting the areas S3 and S4 from the area S2 of the second region 10*r*2 (S2−S3−S4). For example, the internal conductor pattern 25*a* can be configured and positioned such that the ratio of the adjusted second area to the first area S1 ((S2−S3−S4)/S1) is 0.90 to 0.96. The ratio of the adjusted second area to the first area S1 may also be within the range from 0.88 to 0.98 or from 0.86 to 1.0. In practical terms, when the ratio of the adjusted second area to the first area S1 ((S2−S3−S4)/S1) is within the range of 0.86 to 1.0, the magnetic flux density in the first region 10*r*1 is equal or substantially equal to that in the second region 10*r*2.

The shape and position of the internal conductor pattern 25*a* can be simply designed by comparing the area Si of the first region 10*r*1 with the area S2 of the second region 10*r*2 without taking account of the areas and shapes of the strip regions SR1, SR2. In this case, the internal conductor pattern 25*a* may be configured and positioned based on the ratio of S2 to S1. The internal conductor pattern 25*a* can be designed such that the sum of S3 and S4 does not exceed ten percent of S2. In this design, the internal conductor pattern 25*a* is configured and positioned such that the ratio of S2 to S1 is within the range of 0.95 to 1.1.

The shape and the position of the internal conductor pattern 25*a* are not limited to those in the example shown in FIG. 5. The internal conductor pattern 25*a* can have various shapes and positions different from those in the example shown in FIG. 5. Modifications of the internal conductor pattern 25*a* will be hereinafter described with reference to FIGS. 6 to 10.

Figure 6:
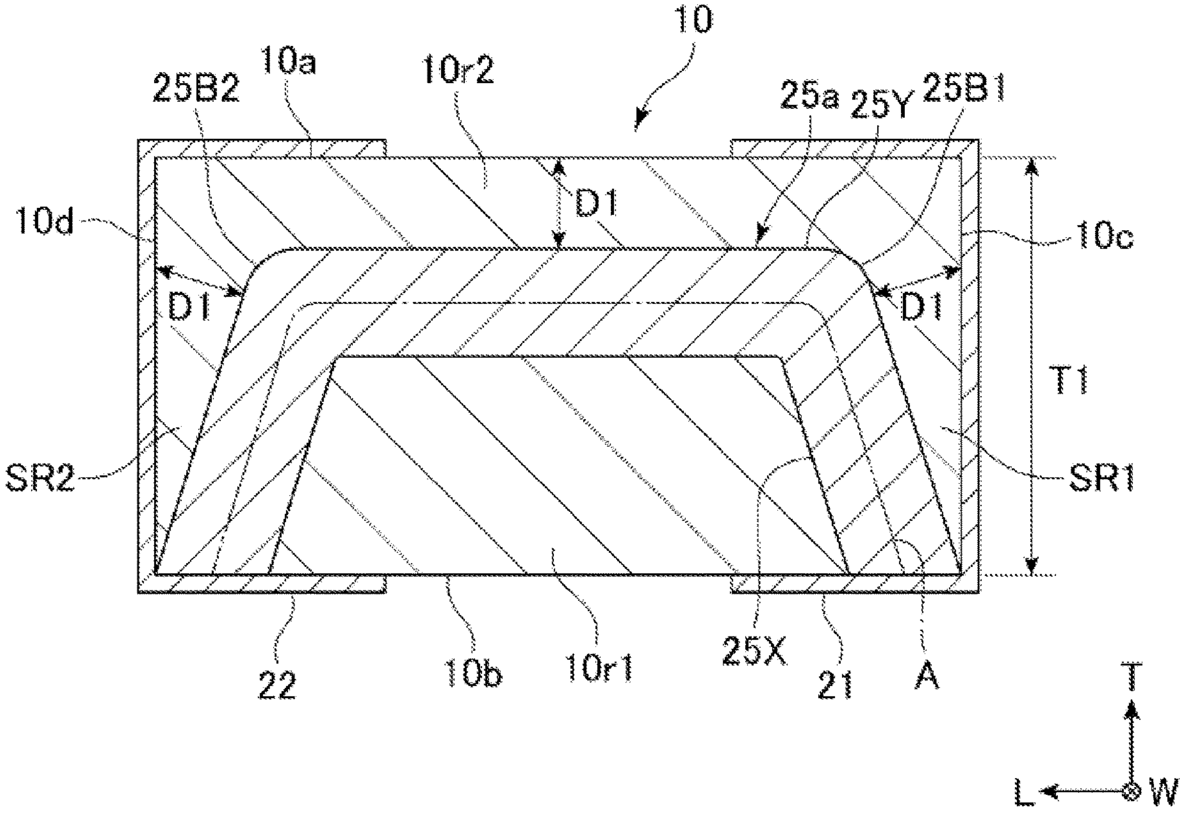
FIG. 6 is a cross-sectional view of an inductor according to another embodiment of the present invention.

In another embodiment of the present invention as a modification of the internal conductor pattern 25*a*, as shown in FIG. 6, the internal conductor pattern 25*a* may be curved at the boundary between the first portion 25*a*1 and the second portion 25*a*2 and the boundary between the second portion 25*a*2 and the third portion 25*a*3. In other words, the outer peripheral surface 25Y has a curved surface 25B1 and a curved surface 25B2. When the outer peripheral surface 25Y includes a point of intersection between straight lines, the magnetic flux may concentrate around the point of intersection. Since the internal conductor pattern 25*a* shown in FIG. 6 includes no points of intersection between straight lines (in other words, it is formed of curved lines only), it can be prevented that the magnetic flux concentrates around such points of intersection. Therefore, the DC superposition characteristics of the inductor 1 can be further improved.

Figure 7:
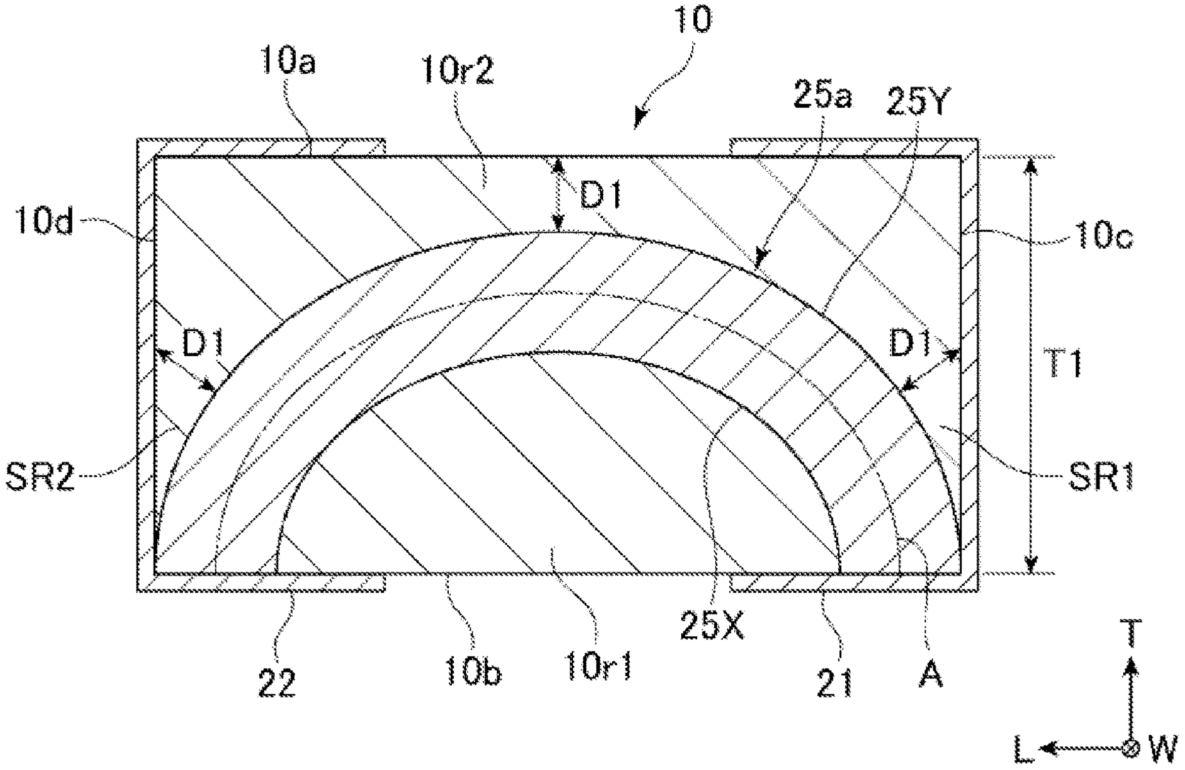
FIG. 7 is a cross-sectional view of an inductor according to another embodiment of the present invention.
Figure 8:
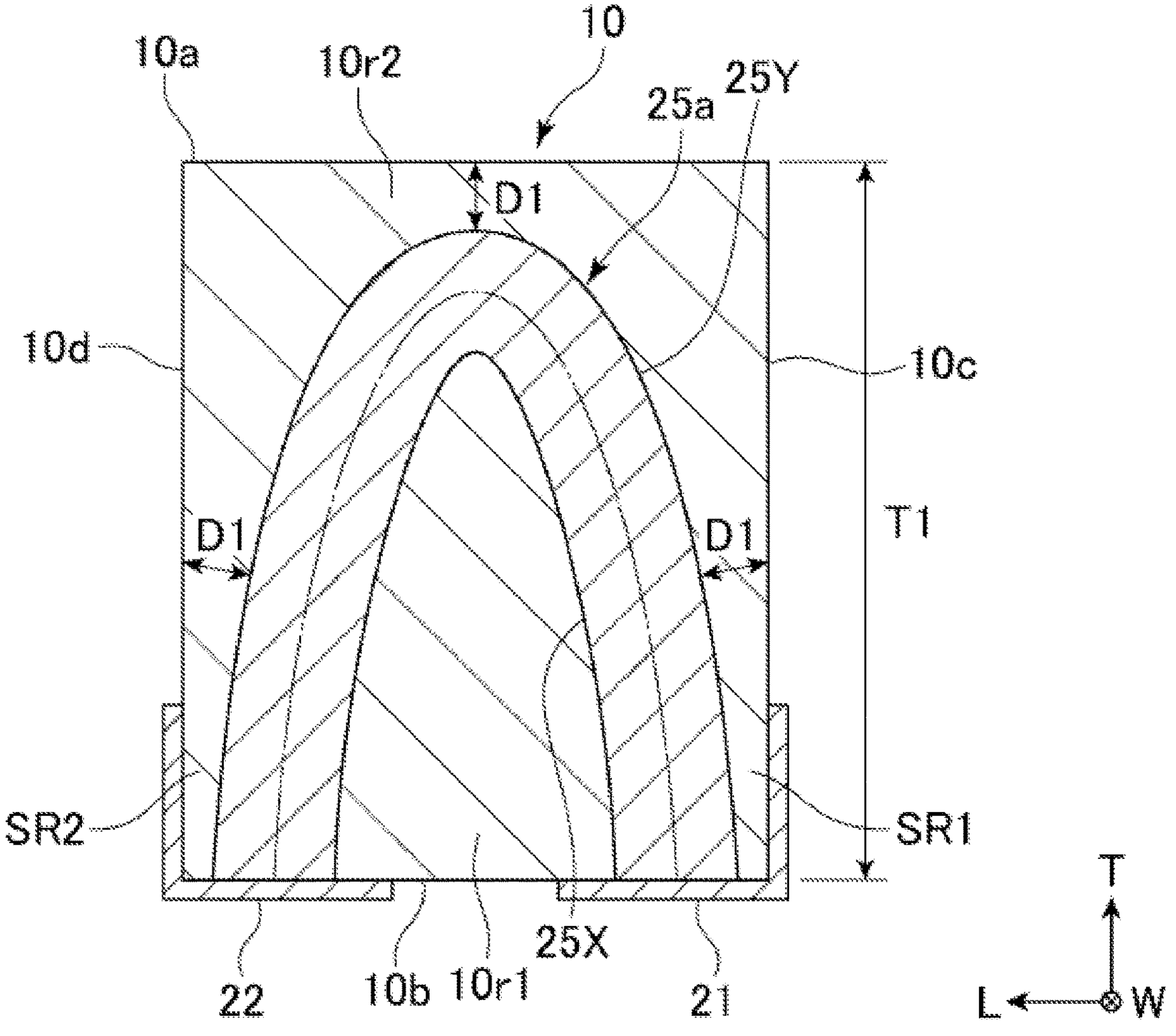
FIG. 8 is a cross-sectional view of an inductor according to another embodiment of the present invention.

In another embodiment as a modification of the internal conductor pattern 25*a*, each of the inner peripheral surface 25X and the outer peripheral surface 25Y of the internal conductor pattern 25*a* may have a cross section viewed from the W axis direction formed of curved lines only. For example, as shown in FIG. 7, the curved lines forming the inner peripheral surface 25X and the outer peripheral surface 25Y may be partial elliptic arcs of an ellipse having a major axis parallel or corresponding to the L axis. As shown in FIG. 8, the curved lines forming the inner peripheral surface 25X and the outer peripheral surface 25Y may be partial elliptic arcs of an ellipse having a minor axis parallel or corresponding to the L axis. As shown in FIGS. 7 and 8, when the internal conductor pattern 25*a* includes no straight portion parallel with the top surface 10*a*, the top margin D1 is the distance between the top surface 10*a* and the position in the outer peripheral surface 25Y of the internal conductor pattern 25*a* that is the closest to the top surface 10*a*. The curved lines forming the inner peripheral surface 25X and the outer peripheral surface 25Y may be partial circular arcs or partial elliptic arcs. Since in the cross section viewed from the W axis direction, the inner peripheral surface 25X and the outer peripheral surface 25Y are formed of curved lines only, it can be prevented that the magnetic flux concentrates in a part of base body 10, thereby improving the DC superposition characteristics of the inductor 1. In particular, since the curves forming the inner peripheral surface 25X and the outer peripheral surface 25Y are partial circular arcs or partial elliptic arcs, it is possible to lower the DC resistance (Rdc), while maintaining the inductance value, as well as to prevent concentration of the magnetic flux.

Figure 9:
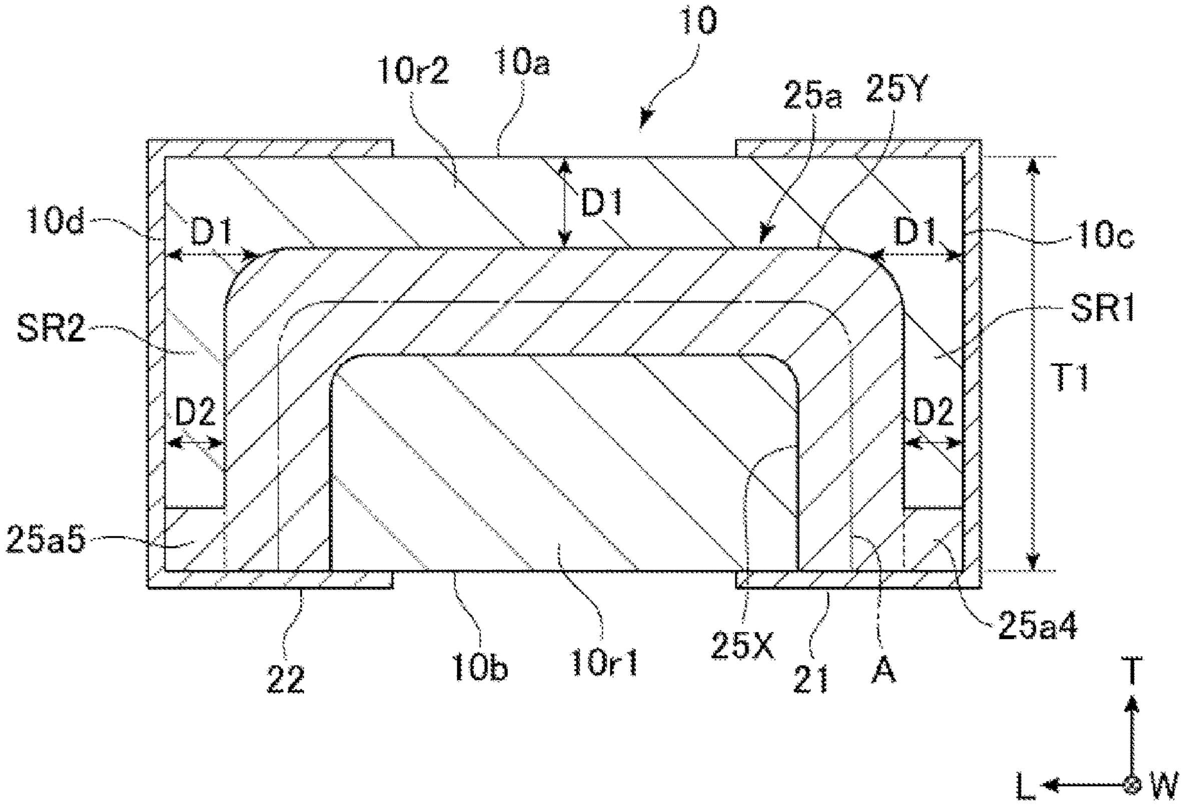
FIG. 9 is a cross-sectional view of an inductor according to another embodiment of the present invention.

In another embodiment of the present invention as a modification of the internal conductor pattern 25*a*, as shown in FIG. 9, the first portion 25*a*1 and the third portion 25*a*3 of the internal conductor pattern 25*a* may extend in parallel with the T axis. In the embodiment shown in FIG. 9, the side margin D2, which is the distance between the first portion 25*a*1 and the first end surface 10*c* of the base body 10, is smaller than the top margin D1. In the embodiment shown, the distance between the third portion 25*a*3 and the second end surface 10*d* of the base body 10 is equal to the side margin D2. Alternatively, the distance between the third portion 25*a*3 and the second end surface 10*d* of the base body 10 may be larger or smaller than the side margin D2, but it should be smaller than the top margin D1. The internal conductor pattern 25*a* shown in FIG. 9 includes a first projection 25*a*4 and a second projection 25*a*5. The first projection 25*a*4 projects from the bottom-side end of the first portion 25*a*1 to the first end surface 10*c*, and the second projection 25*a*5 projects from the bottom-side end of the third portion 25*a*3 to the second end surface 10*d*. The presence of the first projection 25*a*4 and the second projection 25*a*5 reduces the areas of the strip regions SR1, SR2, but since the strip regions SR1, SR2 are magnetically saturated shortly after an electric current starts flowing through the internal conductor pattern 25*a*, the impact of the reduced areas of the strip regions SR1, SR2 on the DC superposition characteristics is small. Therefore, the presence of the first projection 25*a*4 and the second projection 25*a*5 increases the contact areas between the internal conductor pattern 25*a* and the external electrodes 21, 22, thereby ensuring the electric connection therebetween, with no substantial adverse impact on the DC superposition characteristics. In another embodiment, the side margin D2 may be zero.

The internal conductor pattern 25*a* may have various shapes other than those described above. For example, the internal conductor pattern 25*a* may have a shape corresponding to a part of an oval formed of arcs and straight lines.

Next, a description is given of an example of a method for manufacturing the inductor 1 according to one embodiment of the present invention. The inductor 1 can be manufactured by, for example, the laminating process. The following describes, as an example, the method of manufacturing the inductor 1 by the laminating process. FIG. 4 will be referred to as necessary.

The first step is to prepare a plurality of unfired magnetic sheets made of a magnetic material. These unfired magnetic sheets will be fired to form the magnetic layers 11*a* to 11*f* and the cover layers 12, 13. The unfired magnetic sheets are made of, for example, a composite magnetic material containing a binder and a plurality of metal magnetic particles.

Next, a conductive paste is printed on the surface of each of the unfired magnetic sheets, thereby forming unfired conductor patterns to be fired to form the internal conductor patterns 25*a* to 25*f*. Next, the unfired magnetic sheets with the unfired conductor patterns formed thereon are stacked together to obtain an intermediate laminate. A plurality of unfired magnetic sheets to form the cover layer 12 are stacked on one end of the intermediate laminate in the laminating direction, and a plurality of unfired magnetic sheets to form the cover layer 13 are stacked on the other end, thereby obtaining an unfired laminate.

Next, the unfired laminate is diced using a cutter such as a dicing machine or a laser processing machine to obtain an unfired chip laminate. Next, the unfired chip laminate is degreased and then fired to obtain a fired chip laminate. Next, the fired chip laminate is polished by barrel-polishing or the like.

Next, the external electrode 21 and the external electrode 22 are formed on the surface of the chip laminate. Each of the external electrode 21 and the external electrode 22 is formed by, for example, applying a conductive paste onto the surface of the chip laminate that corresponds to the mounting surface 10*b* to form a base electrode and forming a plating layer on the surface of the base electrode. The plating layer is constituted by, for example, two layers including a nickel plating layer containing nickel and a tin plating layer containing tin. At least one of a solder barrier layer and a solder wetting layer may be formed on the external electrode 21 and the external electrode 22 as necessary. In the above-described manner, the inductor 1 is obtained.

A part of the steps included in the above manufacturing method may be skipped as necessary. In the manufacturing method of the inductor 1, steps not described explicitly in this specification may be performed as necessary. Some of the steps included in the above-described manufacturing method of the inductor 1 may be performed in different orders within the purposes of the present invention. Some of the steps included in the above-described manufacturing method of the inductor 1 may be performed at the same time or in parallel, if possible.

Advantageous effects of the above embodiments will be now described. In the inductor 1 according to the above embodiment, the internal conductor 25 extending linearly in plan view is exposed from the mounting surface 10*b* toward the outside of the base body 10 and connected to the external electrodes 21, 22. Therefore, an electric current flowing from the land 3*a* through the external electrode 21 into the internal conductor 25 passes through the internal conductor 25 and flows through the external electrode 22 to the land 3*b*. In this way, the electric current flowing through the inductor 1 flows through the external electrodes 21, 22 for small distances between the land 3*a* and one end of the internal conductor 25 and between the land 3*b* and the other end of the internal conductor 25 (the distances corresponding to the thicknesses of the external electrodes 21, 22 in the T axis direction). In general, an external electrode of an inductor is formed of a material having a lower electric conductivity than an internal conductor. Further, the portion of the external electrode in contact with an end surface of the base body (a surface connecting between the mounting surface and the top surface) have a smaller cross-sectional area than the internal conductor with respect to the directions in which the electric current flows. Therefore, when as in conventional inductors in which the internal conductor extends linearly in parallel with the mounting surface, the internal conductor is exposed from the end surface of the base body, the electric current flows through the external electrode in the interval from the position at which the internal conductor is exposed to the land. The distance from the position in the end surface of the base body at which the internal conductor is exposed to the land is larger than the distance from the mounting surface of the base body to the land, and therefore, the DC resistance of the inductor is increased by the external electrode located in the interval from the position at which the interval conductor is exposed to the land. In the inductor 1 according to the embodiment of the present invention, the internal conductor 25 is exposed from the mounting surface 10*b* of the base body 10, and therefore, the electric current flowing through the inductor 1 flows through the external electrodes 21, 22 for small distances between the land 3*a* and one end of the internal conductor 25 and between the land 3*b* and the other end of the internal conductor 25. In this way, in the inductor 1, the proportion of the external electrodes 21, 22 in the electric current path is smaller than in conventional inductors, making it possible to reduce the DC resistance as compared to conventional inductors.

When the Fe content in the Fe-based metal magnetic particles contained in the base body 10 is 80 wt % or more, the inductor 1 can be used for an application where an electric current per unit volume of 0.15 $A/mm^3$ or more is required. When the Fe content in the metal magnetic particles contained in the base body 10 is 85 wt % or more, the inductor 1 can be used for an application where an electric current per unit volume of 0.2 $A/mm^3$ or more is required.

When the Fe content in the metal magnetic particles contained in the base body 10 is 90 wt % or more, the inductor 1 can be used for an application where an electric current per unit volume of 0.25 A/mm$^3$ or more is required. As described above, magnetic saturation is inhibited in the base body 10 of the inductor 1 according to one or more embodiments of the present invention, and therefore, a large electric current can flow through the internal conductor 25. For example, when the inductance L of the inductor 1 is smaller than 300 nH, an electric current per unit volume of 0.15 A/mm$^3$ or more is possible, when the inductance L of the inductor 1 is smaller than 150 nH, an electric current per unit volume of 0.2 A/mm$^3$ or more is possible, and when the inductance L of the inductor 1 is smaller than 75 nH, an electric current per unit volume of 0.25 A/mm$^3$ or more is possible. In the inductor 1 including the base body 10 containing metal magnetic particles with 80 wt % or more Fe content, a change of inductance caused by application of electric current is small, and less heat is generated. The inductor 1 can also be used for high-frequency applications with, for example, 5 MHz or higher.

The inductor 1 is mounted on the circuit board 2 such that the end surface of the internal conductor 25 contacting with the external electrode 21 is opposed to the land 3*a* of the circuit board 2, and the end surface of the internal conductor 25 contacting with the external electrode 22 is opposed to the land 3*b* of the circuit board 2, thereby suppressing the heat generated in the regions between the inductor 1 and the lands 3*a*, 3*b*, as well as suppressing the heat generated in the inductor 1. Even when the external electrodes 21, 22 between the inductor 1 and the lands 3*a*, 3*b* are formed of a material having a low electric conductivity, the heat generated during application of electric current in the external electrodes 21, 22 can be suppressed.

Conventional inductors including an internal conductor extending linearly are configured such that when the inductors are cut along a plane corresponding to the WT plane in FIG. 1, the cross-sectional shape of the internal conductor is similar to that of the magnetic base body. The internal conductor is positioned in the middle of the magnetic base body to prevent local magnetic saturation in the base body, thereby to obtain excellent DC superposition characteristics. However, when the internal conductor is led out from the mounting surface, it is difficult to form the internal conductor to have a cross-sectional shape similar to that of the magnetic base body. By contrast, in the embodiment of the present invention, the internal conductor 25 is configured and positioned such that the ratio of the area S2 of the second region 10*r*2 between the internal conductor 25 and the top surface 10*a* to the area S1 of the first region 10*r*1 between the internal conductor 25 and the mounting surface 10*b* (S2/S1) is within the range of 0.95 to 1.1, thereby preventing concentrated magnetic saturation in one of the first region 10*r*1 and the second region 10*r*2. This prevents or inhibits the deterioration of the DC superposition characteristics of the inductor 1, in spite of the internal conductor 25 being led out from the mounting surface 10*b*. The range of the ratio of areas S2/S1 is not centered at 1.0 but biased upward, because when the internal conductor 25 is led out, the area of the second region 10*r*2 often includes the strip regions (for example, the strip regions SR1, SR2 shown in FIGS. 5 to 9) which contribute less to the increase of the saturated magnetic flux. When the base body 10 includes narrow strip regions SR1, SR2, which are magnetically saturated shortly, the internal conductor 25 can be configured and positioned such that the ratio of the area of the first region 10*r*1 to the area of the second region 10*r*2 minus the areas S3, S4 of the strip regions SR1, SR2 ((S2−S3−S4)/S1) is within the range of 0.86 to 1.0, thereby preventing concentrated magnetic saturation in one of the first region 10*r*1 and the second region 10*r*2.

In the above embodiment, the external electrodes 21, 22 are provided such that at least one of the external electrode 21 and the external electrode 22 contacts with the mounting surface 10*b* and the first end surface 10*c* or the second end surface 10*d*. This arrangement makes it possible to enlarge the dimension of the base body 10 in the L axis direction by the widths of the external electrodes 21, 22 up to the preset dimension of the inductor 1 in the L axis direction. In the embodiment shown in FIG. 10, at least one of the external electrode 21 and the external electrode 22 contacts with only the mounting surface 10*b*, and therefore, the external electrodes 21, 22 are not in contact with the first end surface 10*c* or the second end surface 10*d* of the base body 10. This arrangement makes it possible to enlarge the dimension of the base body 10 in the L axis direction by the widths of the external electrodes 21, 22 up to the preset dimension of the inductor 1 in the L axis direction. Also, this arrangement makes it possible to reduce the installation area of the inductor 1 mounted on the circuit board 2.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. An inductor comprising:

a base body having a mounting surface facing a circuit board, a top surface opposed to the mounting surface, and a first end surface connecting between the mounting surface and the top surface;

a first external electrode provided to the mounting surface of the base body;

a second external electrode provided to the mounting surface, the second external electrode being spaced from the first external electrode in a length direction perpendicular to the first end surface; and a conductor disposed inside the base body, the conductor extending linearly from the first external electrode to the second external electrode in plan view from a thickness direction perpendicular to the mounting surface, one end of the conductor being exposed from the mounting surface and connected to the first external electrode, the other end of the conductor being exposed from the mounting surface and connected to the second external electrode, wherein in front view from a width direction perpendicular to the thickness direction and the length direction, the base body is partitioned into a first region and a second region, the first region being enclosed by the conductor and the mounting surface, the second region being the rest of the base body, wherein the first region has a first area, and the second region has a second area, and a ratio of the second area to the first area is within a range of 0.95 to 1.1, and wherein the conductor contains a conductive material having a higher electric conductivity than a material of the first external electrode.

2. The inductor according to claim 1, wherein the base body has a second end surface opposed to the first end surface, wherein in the front view, the second region includes a first strip region and a second strip region, the first strip region being positioned between the conductor and the first end surface such that a distance between the conductor and the first end surface is smaller than a top margin representing a distance between the conductor and the top surface, the second strip region being positioned such that a distance between the conductor and the second end surface is smaller than the top margin, and wherein a ratio of an adjusted second area to the first area is within a range of 0.86 to 1.0, the adjusted second area being obtained by subtracting an area of the first strip region and an area of the second strip region from the second area.

3. The inductor according to claim 1, wherein in the front view, a shortest distance between an axis of the conductor and the top surface is smaller than a half of a distance between the mounting surface and the top surface of the base body.

4. The inductor according to claim 1, wherein a cross section of the conductor cut along a direction perpendicular to an axis of the conductor has a first cross-sectional area, and a cross section of the first external electrode cut along a direction parallel with the mounting surface has a second cross-sectional area, and the first cross-sectional area is larger than the second cross-sectional area.

5. The inductor according to claim 1, wherein the base body has a second end surface opposed to the first end surface, wherein the first external electrode includes a first electrode portion and a second electrode portion, the first electrode portion extending along the mounting surface, the second electrode portion extending along the first end surface, wherein the second external electrode includes a third electrode portion and a fourth electrode portion, the third electrode portion extending along the mounting surface, the fourth electrode portion extending along the second end surface, wherein said one end of the conductor is exposed from the mounting surface and first the end surface and connected to the first electrode portion and the second electrode portion of the first external electrode, wherein the other end of the conductor is exposed from the mounting surface and the second end surface and connected to the third electrode portion and the fourth electrode portion of the second external electrode.

6. The inductor according to claim 1, wherein the first external electrode is provided to the base body so as to contact with only the mounting surface thereof.

7. The inductor according to claim 1, wherein the second external electrode is provided to the base body so as to contact with only the mounting surface thereof.

8. The inductor according to claim 1, wherein the conductor is formed of Ag.

9. The inductor according to claim 1, wherein the conductor is formed of Cu.

10. The inductor according to claim 1, wherein an electric current per unit volume of the inductor is 0.15 $A/mm^3$ or more.

11. The inductor according to claim 1, wherein an electric current per unit volume of the inductor is 0.2 $A/mm^3$ or more.

12. An electronic device comprising the circuit board according to claim 11.

13. The inductor according to claim 1, wherein an electric current per unit volume of the inductor is 0.25 $A/mm^3$ or more.

14. The inductor according to claim 1, wherein the base body has a length in the length direction and a thickness in the thickness direction, wherein the length of the base body is 10 mm or less, and wherein the thickness of the base body is less than the length of the base body.

15. The inductor according to claim 1, wherein the base body has a length in the length direction and a thickness in the thickness direction, wherein the thickness of the base body is 10 mm or less, and wherein the length of the base body is less than the thickness of the base body.

16. A circuit board comprising the inductor according to claim 1.

* * * * *